United States Patent [19]

Reneau

[11] Patent Number: 4,728,125
[45] Date of Patent: Mar. 1, 1988

[54] GRIP AND SEAL MECHANICALLY LOCKING FLOWLINE CONNECTOR

[75] Inventor: Bobby J. Reneau, 15527 Morales, Houston, Tex. 77032

[73] Assignees: Bobby J. Reneau; Luther L. Manchester, both of Houston, Tex.

[21] Appl. No.: 818,090

[22] Filed: Jan. 10, 1986

[51] Int. Cl.⁴ .............................................. F16L 35/00
[52] U.S. Cl. ........................................ 285/18; 285/82; 285/104; 285/317; 285/920; 285/322
[58] Field of Search .................... 285/322, 323, 18, 82, 285/317, 104, 920

[56] References Cited

U.S. PATENT DOCUMENTS

| 290,196 | 12/1883 | Abel . |
| 1,807,046 | 5/1931 | Rasmussen et al. . |
| 1,824,422 | 9/1931 | Badger . |
| 2,137,853 | 11/1938 | Nixon . |
| 2,676,037 | 4/1954 | Mueller . |
| 3,056,617 | 10/1962 | Snoddy . |
| 3,353,847 | 11/1967 | Brown . |
| 3,393,926 | 7/1968 | Arnold . |
| 3,598,429 | 7/1971 | Arnold . |
| 3,695,633 | 10/1972 | Hanes . |
| 3,695,634 | 10/1972 | White, Jr. . |
| 3,695,640 | 10/1972 | Clague . |
| 3,704,033 | 11/1972 | Arnold . |
| 3,711,123 | 1/1973 | Arnold . |
| 3,712,647 | 1/1973 | Stecher . |
| 3,713,204 | 1/1973 | Arnold . |
| 3,733,093 | 5/1973 | Seiler . |
| 3,784,234 | 1/1974 | Mohr . |
| 3,874,706 | 4/1975 | Arnold . |
| 3,944,263 | 3/1976 | Arnold . |
| 3,977,702 | 8/1976 | White, Jr. et al. . |
| 3,986,728 | 10/1976 | Marsh . |
| 3,999,782 | 12/1976 | Shotbolt et al. . |
| 4,006,921 | 2/1977 | Mohr . |
| 4,040,650 | 8/1977 | Shotbolt . |
| 4,045,054 | 8/1977 | Arnold . |
| 4,049,297 | 9/1977 | Reneau . |
| 4,109,940 | 8/1978 | Reneau ................................ 285/18 |
| 4,109,945 | 8/1978 | Manchester et al. . |
| 4,138,147 | 2/1979 | Manchester et al. . |
| 4,290,632 | 9/1981 | Manchester et al. . |
| 4,330,143 | 5/1982 | Reneau . |

Primary Examiner—Dave W. Arola
Attorney, Agent, or Firm—David Alan Rose; Ned L. Conley; William E. Shull

[57] ABSTRACT

Apparatus for connecting together flowlines including separately actuated gripping and sealing assemblies which are actuated by hydraulic pressure but are held in actuated positions utilizing internally mounted mechanical-type mechanisms.

21 Claims, 7 Drawing Figures

GRIP AND SEAL MECHANICALLY LOCKING FLOWLINE CONNECTOR

TECHNICAL FIELD OF THE INVENTION

This invention relates to apparatus for connecting together first and second flowline members which may be relatively inaccessible, such as located on the ocean floor.

BACKGROUND OF THE INVENTION

The search for oil and gas offshore has moved drilling and production activity further and further out to sea into deeper waters. Part of any such oil and gas well production activity is the need for underwater flowline connections for connecting together or repairing flowlines located subsea. Such subsea flowline connectors can be installed utilizing divers or Remote Operated Vehicles (ROV), which have become more and more common due to the necessity of working at increasing water depths. Further, the need to make necessary repairs to existing subsea pipelines continues the challenge of making underwater repair connections that can be efficiently implemented by divers. The utilization of Remote Operated Vehicles as well as other hydraulically actuated equipment allows such underwater pipeline connections to be made utilizing at least in part hydraulic fluid under pressure. However, the utilization of hydraulic fluid under pressure to make such flowline connections requires such flowline connectors to have highly efficient gripping and sealing mechanisms. Another problem with such hydraulically actuated flowline connectors is the operability and reliability of mechanisms for locking the gripping and sealing members in actuated positions. These problems must be solved utilizing structural elements in efficient structural relationships to allow for efficient hydraulic actuation and highly reliable locking mechanisms to hold the various elements of the flowline connector in locked position.

There are a number of patents directed to various types of flowline connectors. For example, U.S. Pat. No. 4,180,285 of Reneau discloses a ball-type connector wherein the female housing includes a cup-shaped receptacle for receiving the curved surface of the male or ball member. The ball is pivotal relative to the cup-shaped receptacle and a collar is mounted about the ball and is moved to various positions through a series of hydraulic piston assemblies. The collar and the cup-shaped receptacle are joined together utilizing a ring which is moveable radially inwardly by means of a hydraulically actuated tapered wedge. In this type of ball-type connector, there is no utilization of separate gripping and sealing elements which are hydraulically actuatable. There are many other hydraulically-actuatable underwater connectors including, for example, U.S. Pat. Nos. 3,874,706; 3,944,263; and others cited in U.S. Pat. No. 4,180,285. Examples of mechanically actuatable flowline connectors include U.S. Pat. Nos. 4,109,945; 4,290,632 and 4,330,143. U.S. Pat. No. 4,109,945 dicloses an apparatus for connecting together flowline end portions which include a generally cylindrical housing having separated sealing and gripping mechanisms. The gripping mechanism includes opposing camming areas for moving collet portions radially inwardly into engagement with a flowline. The collet member as well as the sealing elements are mechanically actuated utilizing bolt-actuated flange structures. U.S. Pat. No. 4,290,632 discloses a mechanically actuatable apparatus for connecting together flowline portions which include separate sealing and gripping sections for engaging a flowline member. The sealing and gripping sections are both actuated by bolt members which serve to axially move an internal, flanged member. U.S. Pat. No. 4,330,143 discloses another version of such mechanically actuated flowline connectors which includes a single collet member which is actuated by a bolt-type actuating mechanism.

SUMMARY OF THE INVENTION

It is an object of this invention to provide a new and improved flowline connector which is actuated by hydraulic fluid under pressure and wherein the actuated elements are locked into position mechanically. The apparatus for connecting together flowlines includes a generally cylindrical housing having a first end for connection to a first flowline and having a bore therethrough. The generally cylindrical housing has a second, open end to receive a second flowline in the bore. A generally cylindrical gripping means is mounted within the bore for receiving the second flowline member. The gripping means is moveable radially inwardly into gripping engagement with the second flowline. A camming means is mounted within the housing bore and in engagement with the gripping means for moving the gripping means into gripping engagement with the second flowline in response to relative movement between the camming means and the gripping means. A gripper actuator means is mounted within the housing bore for axial movement from an initial to an actuated position in engagement with the gripping means to effect relative movement between the gripping means and the camming means in order to move the gripping means into gripping engagement with the second flowline. A grip position lock means is mounted with the housing in engagement with the gripper actuator means for locking the gripper actuator means in the actuated position.

The apparatus further includes a generally cylindrical sealing means mounted within the housing bore for radial expansion in response to axial compression of the sealing means to seal between the second flowline and the housing bore. A seal actuator means is mounted within the housing bore for axial movement from an initial to an actuated position in sufficient engagement with the seal means to axially compress the seal means to effect a seal between a second flowline and the housing bore. A seal position lock means is mounted within the housing in engagement with the seal actuator means for locking the seal actuator means in said actuated position. And, fluid actuator means is provided for using pressurized fluid to move the grip actuator means and the seal actuator means to the actuated positions.

This Summary of this Invention is intended to be a summary only and is not intended to be a representation or recitation of all of the patentable features of this invention. The patentable features of this invention are disclosed in the detailed specification to follow and are claimed in the claims set forth thereinafter.

DESCRIPTION OF THE PREFERRED EMBODIMENT

Figure 6:
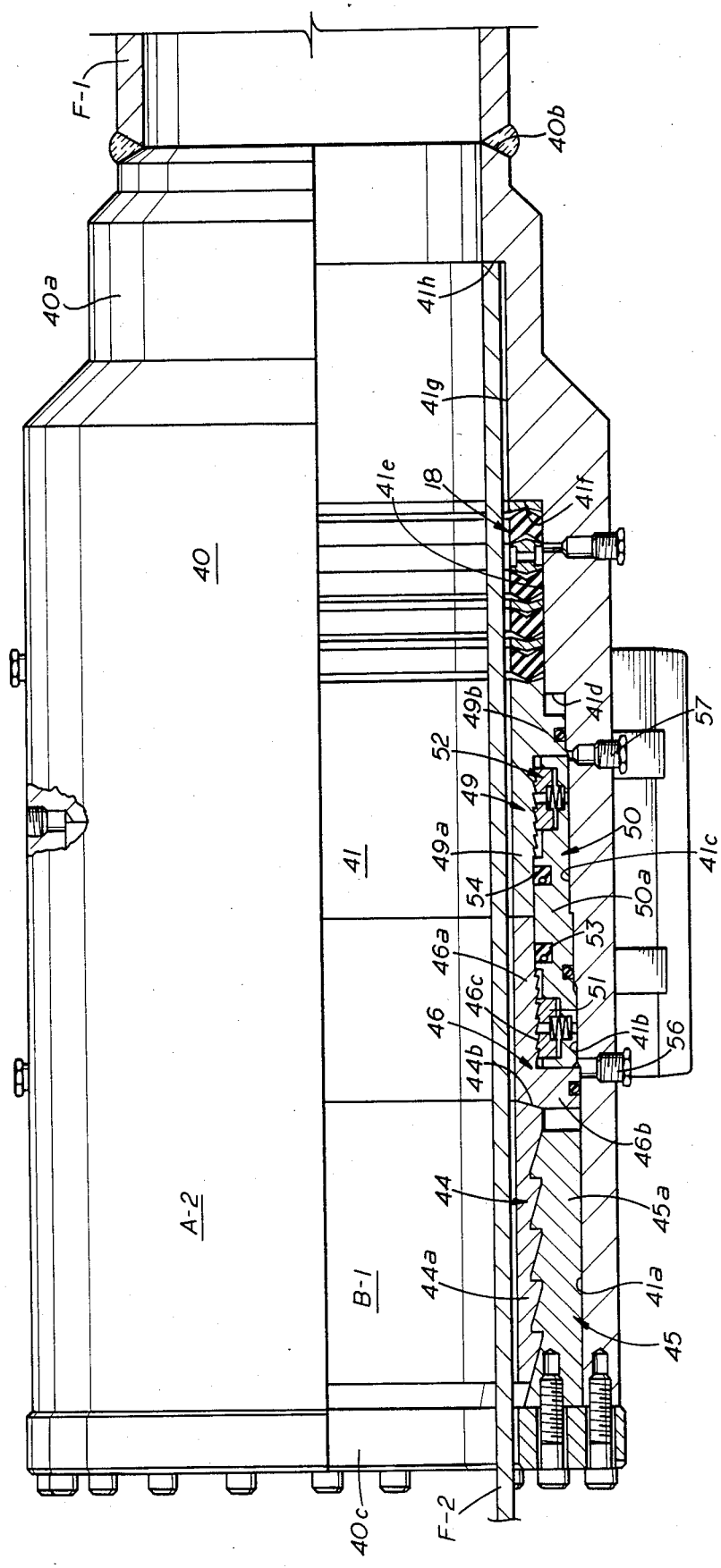
FIG. 6 is a side view partly in section of another embodiment of the flowline connection apparatus of this invention.

Referring to the drawings, the letter A-1 generally designates apparatus for connecting together flowlines. The apparatus A-1 is further illustrated in FIGS. 1-5A. Apparatus A-2 for connecting together flowlines is illustrated in FIG. 6. Referring to FIGS. 1-5A, the apparatus A-1 is provided for connecting together flowlines F-1 and F-2. The flowlines F-1 and F-2 are only shown in part in FIG. 1. The flowlines F-1 and F-2 may be located subsea such as on the ocean floor or at any other location and thus either of the apparatus A-1 and the A-2 of this invention is applicable not only for underwater connections but for any connections of flowline members.

The apparatus A-1 includes a generally cylindrical housing 10. The generally cylindrical housing 10 includes a cylindrical inside wall generally identified as 11 which forms the main bore B extending through the entire housing. The housing 10 terminates in a first end portion which includes an annular beveled edge 10a provided for the purpose of butt-welding to the flowline F-1 or to a flange or other connection member leading to the flowline F-1. The housing 10 terminates in a second, open end generally designated at 10b which is provided to receive the flowline F-2. For the purposes of illustration, only a bottom section of the flowline F-2 is illustrated in position in the bore B.

The inside wall 11 is actually formed of several sections. Beginning at the second, open end, the first inside wall section 11a is the section of largest inside diameter. The inside wall section 11a extends from the second, open housing end 10b to a first radial shoulder 11b. The first radial shoulder 11b joins an intermediate bore section which is formed by inside cylindrical wall portion 11c. The inside cylindrical wall portion 11c terminates in another radial shoulder portion 11d which joins to a smaller inside wall portion 11e. The inside wall portion 11e terminates in a final radial shoulder 11f which receives the very end of the flowline F-2. A final, short inside wall portion 11g extends to and terminates at the outside housing beveled surface 10a.

Basically, the apparatus A-1 includes a generally cylindrical gripping means identified as 14 mounted within the bore B for receiving the second flowline member F-2. The generally cylindrical gripping means 14 is moveable radially inwardly into gripping engagement with the second flowline member F-2. A camming means generally designated as 15 is mounted within the housing bore B in engagement with the gripping means 14 for moving the gripping means into gripping engagement with the second flowline member F-2. A grip actuator means generally designated as 16 is mounted within the housing bore B for axial movement from an initial position to an actuated position in engagement with the gripper means 14 to effect relative movement between the gripper means 14 and the camming means 15 to move the gripping means 14 into gripping engagement with the second flowline F-2. A grip position lock means generally designated as 17 is mounted with the housing in engagement with the gripper actuator means 16 for locking the gripper actuator 16 in the actuated position. A generally cylindrical sealing means generally designated as 18 is mounted within the housing bore for radial expansion in response to axial compression to seal between the second flowline F-2 and the inside wall 11c. A seal actuator means generally designated as 19 is mounted within the housing bore B for axial movement from an initial to an actuated position in sufficient engagement with the sealing means 18 for axial movement from an initial to an actuated position to axially compress the sealing means 18. Seal position lock means generally designated as 20 is mounted with the housing in engagement with the seal actuator means 19 for locking the seal actuator means 19 in the actuated position. And, fluid actuator means generally designated as 21 is mounted with the housing for applying fluid under pressure to move the grip actuator means 16 and the seal actuator means 19 to the actuated positions.

The camming means 15 includes a cylindrical member 15a having a smooth, outer cylindrical surface of an outer diameter substantially equal to the diameter of the inside bore wall 11a of the housing 10. The interior surface 15b of the camming member 15a includes a plurality of inclined surface portions separated by radial steps for providing a plurality of wedging surfaces to act against the gripping means 14. An interior cylindrical recess is formed by radial shoulder 15c and interior cylindrical portion 15d.

The gripping means 14 is a generally cylindrical member having an interior grooved surface 14a (FIG. 2) of an initial diameter slightly larger than the outer diameter of the flowline F-2. The outer surface of the gripping member 14 includes a plurality of inclined wedging surfaces 14b separated by radial shoulders 14c which are complementary to the wedging surfaces on the camming member inside surface 15b. The gripping member 14 is a collet-type member and thus includes a plurality of circumferentially spaced slots (not shown) which extend from opposite ends of the collet member 14 in a known manner whereby, upon relative movement between the gripping member 14 and the camming member 15a, the collet member is cammed or wedged radially inwardly into gripping engagement with the flowline member F-2. The gripping member 14 terminates on its interior end surface at an inclined end surface 14d.

The gripper actuator means 16 includes a generally cylindrical member 16a including a main portion 16b which terminates toward the second open end 10b of the housing in a radially directed end surface 16c. The gripper actuator member further includes a radially outwardly located portion 16d. The outer surface of the main portion 16b of the gripper actuator member 16a is generally cylindrical and includes a ratchet section 16e which is formed by a plurality of circumferential grooves or teeth generally designated as 16f (see FIG.

5A for close-up). The gripper actuator member 16a further includes radial surface 16g extending outwardly from the grooved surface 16e to an outer cylindrical surface 16h. The outer cylindrical surface 16h also includes a ratchet-type surface portion 16i having a plurality of ratchet-type teeth or grooves identical in surface configuration to the ratchet-type teeth 16f on surface 16e. The outer surface portions 16g and 16h on the gripper actuator member 16a cooperate with a generally radially directed inner surface 16j and an interior cylindrical surface 16k (FIG. 1) to form the outer end portion 16d which rides in the annular recess formed by camming member shoulder 15c and surface 15d. An O-ring seal 16l in outer surface 16h serves to mount the outer end 16d of the gripper actuator member 16a for slideable, sealable movement along the outer bore wall 11a.

The grip position lock means 17 is mounted in the outer wall 11a of the housing 10 for engaging in a ratchet-type manner the outer surface 16d of the member 16a to hold the gripper actuator member 16a in an actuated position. The grip position lock means 17 is formed by a circumferential groove 11h machined into the inside cylindrical wall 11a of the housing 10. Referring to FIGS. 1, 2, 4 and 5, a plurality of curved locking segments 17a are circumferentially positioned in the groove 11h in the housing. Each ratchet-type segment or locking member 17a includes an interior, curved ratchet-type surface having a plurality of teeth or grooves 17b which are alignable with teeth such as 16f of the grip actuator member 16a illustrated in FIG. 5A. The individual ratchet-type members 17a each include a circular recess 17c machined in the outside surface thereof which opens to an interior hole at 17d such that fluid may travel from the outside to the inside of each ratchet member thus equalizing the pressure across the ratchet members. A spring element 25 is mounted within each of the circular recesses 17c in the ratchet members for positioning within the circumferential recess 11h to resiliently urge each of the ratchet members 17a into a resilient and continuous engagement with the outer surface 16i on the gripper actuator member 16a. Utilizing the resiliently, radially, inwardly urged ratcheting elements 17a, the gripper actuator member 16a is locked in position and prevented from returning to its initial position as the gripper actuator member 16a is moved axially toward the second, open end 10b of the housing 10.

The generally cylindrical sealing means 18 is a standard-type of Chevron-type of packing seal which is positioned onto the inside bore wall 11c of the housing 10. Typically, such a Chevron-type of packing includes a plurality of sealing elements 18a interposed between mounting rings 18b in a known manner. Upon axial compression of the sealing means 18, the sealing elements 18a are radially expanded into sealing engagement with the outside surface of the flowline F-2 and into sealing engagement with the interior bore wall 11c of the housing 10. The sealing means 18 is axially compressed by the seal actuator means 19.

The seal actuator means 19 includes the seal actuator member or piston 19a which is mounted concentrically between the grip actuator piston 16a and the inside bore wall 11a. The seal actuator member 19a includes a seal actuator end portion 19b for axially engaging the seal means 18 to axially compress the seal means 18. Basically, the seal actuator member or piston 19a is generally cylindrical in its main portion and includes an outside cylindrical surface portion 19b having O-ring 23 to mount the outside portion for slideable, sealable movement with respect to housing bore wall 11a. Radial outside shoulder 19c forms the sealing actuator end portion 19b which includes a cylindrical surface portion which actually slides against the bore wall portion 11c. The bore wall portion 11c includes an O-ring 26 to mount the seal actuator end portion 19b for slideable, sealable movement against the bore wall 11c.

The seal position lock means generally designated as 20 is mounted with the seal actuator piston 19a in continuous engagement with the outside surface 16e of the grip actuator member 16a. The seal position lock means 20 is provided for holding the relative position of the seal actuator piston 19a with respect to the grip actuator member 16a and to thus hold the seal actuator piston 19a in an actuated position. The seal position lock means 20 is similar in structure to the grip position lock means 17 and thus includes a plurality of circumferentially spaced ratchet elements 17a are positioned in a circumferential groove 19e machined in the inner surface of the seal actuator member 19a. Each of the seal position locking segments 17a are identical in structure to the grip position locking elements given the same number and thus will not be redescribed, except to say that again each ratchet element 17a is resiliently urged inwardly by a spring member 25. A seal member 27 is mounted in a groove machined in the inside surface of the seal actuator piston 19a to slideably, sealably engage the outer surface of the main portion 16b of the grip actuator member to mount the grip actuator member 16a and the seal actuator piston 19a for slideable, sealable movement with respect to each other.

The fluid actuator means 21 includes a first fluid entry port 21a machined into the housing 10. The fluid entry port 21a has mounted therein a suitable valve element 21b for receiving hydraulic fluid under pressure from a hydraulic line 28, which is illustrated schematically in FIGS. 1 and 2. The valve element 21b may be a check-type valve to allow the entry of hydraulic fluid under pressure from a source such as a ROV. A second fluid entry port is provided by the relief valve 21c mounted into the housing. The relief valve 21c allows the release of hydraulic fluid under pressure located within the annular space 29 formed between the housing inside bore wall 11a and the seal actuator piston member 19a. This annular space is formed by the right angle shoulder 19c and the outside surface of end 19b of the seal actuator member 19.

In operation and use, the apparatus A-1 has welded at its first housing end 10a a flowline member F-1 or a flange to connect to a flowline member F-1. Such a flowline member F-1 may be mounted at the bottom of the ocean floor or at another location. The apparatus A-1 is provided for receiving the second flowline member F-2 which is inserted into the main housing bore B and abuts against the inside radial shoulder 11f. The annular space 29 is filled with hydraulic fluid in order to hold the position of the seal actuator member 19a. Then, hydraulic fluid under pressure is provided through the fluid entry port at 21a and the valve 21b such that hydraulic fluid under pressure is directed against the radial shoulder 16g thereby moving the grip actuator member 16a axially toward the second, open housing end 10b. As the grip actuator member 16a is moved axially from its initial position toward the left in the drawing of FIG. 1, the ratchet elements 17a in continuous engagement with the ratchet-type surface 16f on the grip actuator 16a continuously locks the displaced position of the grip actuator member 16a. Movement of the grip actuator member 16a toward the seoond, open end of the housing serves to cause radial movement between the collet 14 and the oamming member 15a thereby moving the collet radially inwardly into gripping engagement with the flowline F-2. When the grip actuator member 16a is in its final, actuated position wherein the collet 14 has been moved into radial, gripping engagement with the pipe or flowline F-2, the plurality of ratchet-type elements 17a as resiliently urged inwardly lock the grip actuator member 16a in the actuated position. Thereafter, the relief valve 21c is activated to allow the fluid in the annular cavity or space 29 to be relieved. The introduction of further hydraulic fluid through the valve 21b thereafter moves the seal actuator member 19a toward the seal means 18 causing a compression of the seal means 18 and thus a radial expansion of the seal means 18 into sealing engagement with the flowline F-2 and with the interior bore wall portion 11c. As the seal actuator member 19a is moved toward the seal means 18, its position is also locked by means of the seal position lock means 20. The interengagement of the ratchet teeth on the ratchet elements 17a located in the circumferential groove 19e continuously engage against and lock against the teeth on the surface 16f of the grip actuator member 16a thus locking the relative position between the seal actuator member 19a and the grip actuator member 16a. In this manner, when the hydraulic fluid under pressure directed through the fluid entry point 21a has moved the seal actuator member to its final, actuated position, the radial segments 17a of the seal position lock means 17 lock the seal actuator piston 19a in the actuated position.

The apparatus A-1 of this invention has a number of advantages including, as previously mentioned, the mechanically locking of the gripping actuator piston 16a and the seal actuator piston 19a in the final, actuated lock positions thereby holding the gripping means 14 and the sealing means 18 in the respective gripping and sealing positions.

Figure 1:
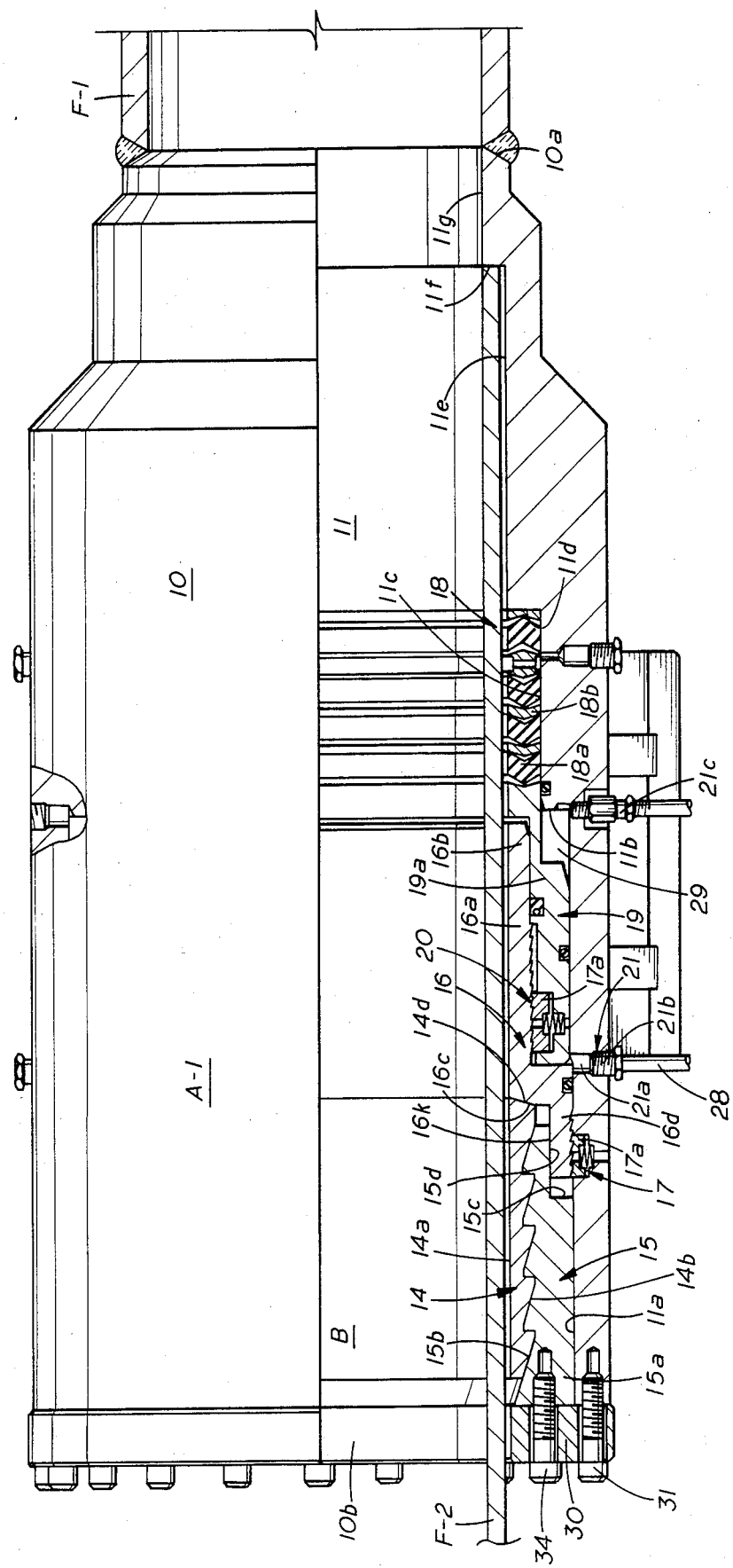
FIG. 1 is a partly sectional view of the first embodiment of the flowline connection apparatus of this invention.
Figure 2:
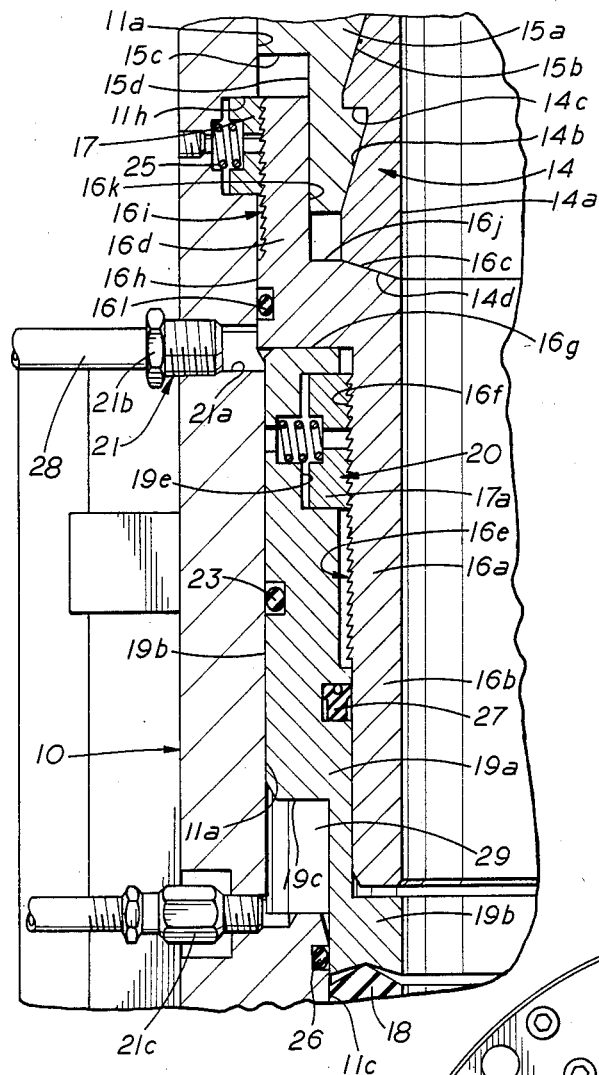
FIG. 2 is an exploded view of the gripping and sealing mechanism and the means for locking the gripping and sealing mechanism in actuated positions.
Figure 3:
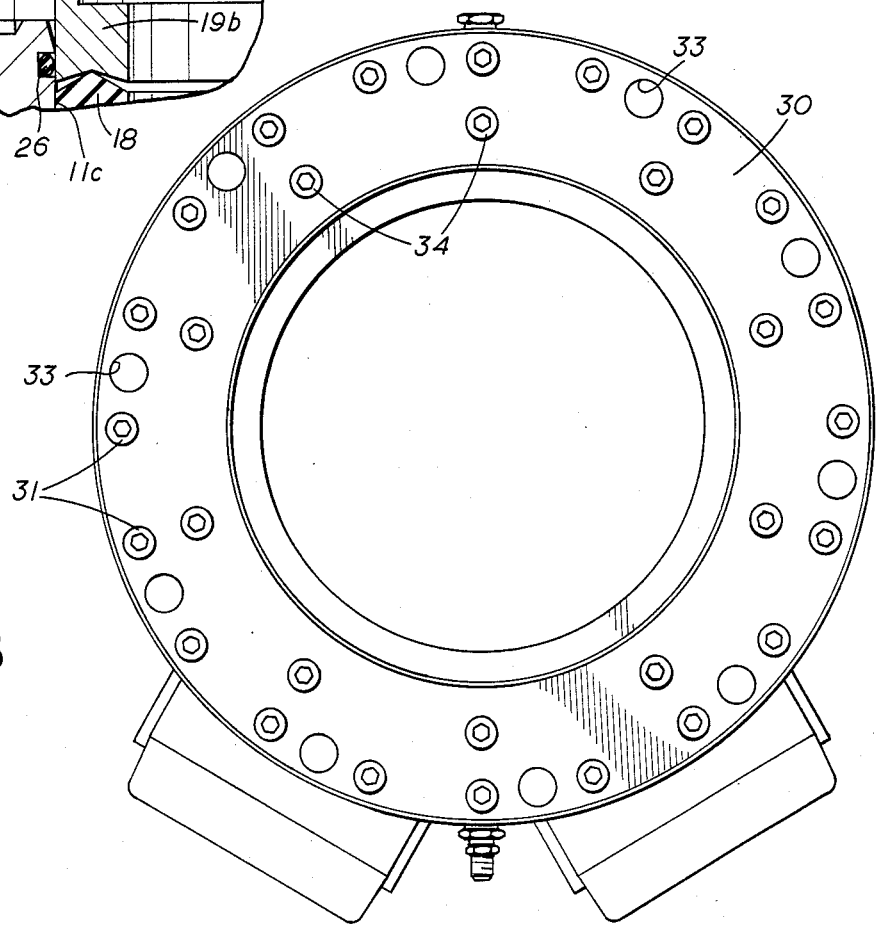
FIG. 3 is an end view of the flowline connection apparatus.
Figure 4:
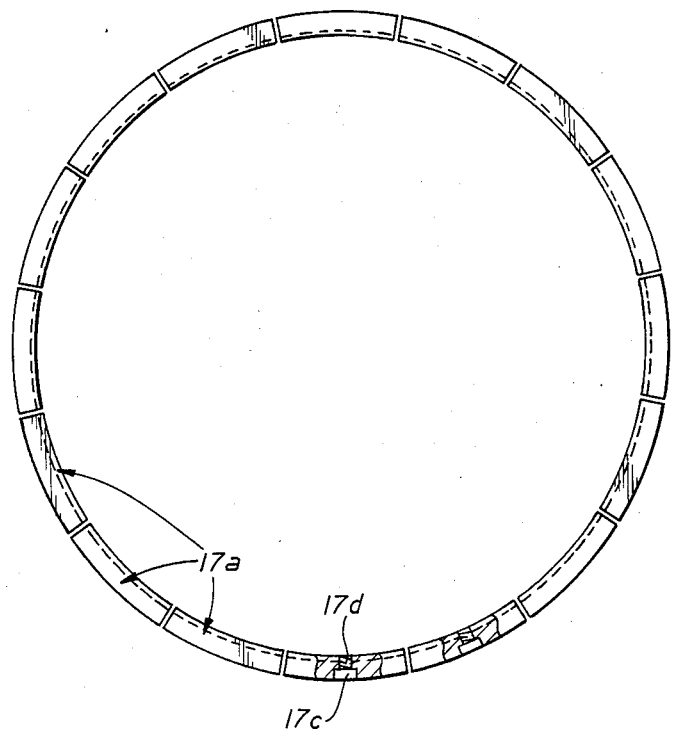
FIG. 4 is a side view, partly schematic and partly in section, illustrating the circumferential spacing of the locking mechanisms of this invention.
Figure 5:
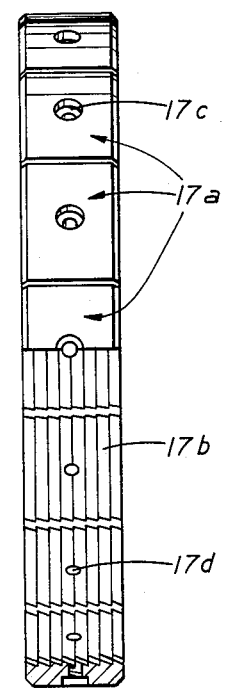
FIG. 5 is a side view of the locking mechanism removed from cooperation with the other structural elements to illustrate the positioning of such locking elements.
Figure 5A:
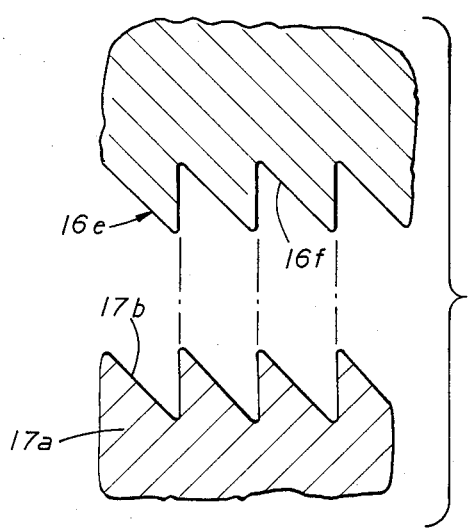
FIG. 5A is an exploded view of the relative engagement of the ratchet-type surfaces utilized in the locking elements of this invention.

During testing, it is necessary to actuate the device and then release the device from actuation. The release is provided by the annular end cap 30 in the manner in which it is mounted to the housing 10. Referring to FIGS. 1 and 3, the annular end cap 30 is attached to the housing 10 by a plurality of circumferentially spaced bolts 31 which extend through threaded openings in the annular cap 30 and into threaded bores in the end of the housing 10. When the apparatus A-1 has been tested, the gripper actuator member 16a has been moved to an actuated position wherein the collet 14 has been moved radially inwardly. The collet 14 is thus in a locked position against a flowline piece F-2 (only a piece is used for shop testing) and it is necessary to release that collet from the radially inward position in order to release the assembly. In order to release the collet, which has been moved axially relative to the camming element 15a, the mounting bolts 31 are removed. Then, bolts are inserted into the threaded openings 33 which are circumferentially spaced about the annular end cap 30. However, the threaded openings 33 are not aligned with threaded bores in the housing 10 but rather are aligned with unthreaded bores. Thus, when the bolts such as 31 removed from the cap are inserted into the threaded openings 33 and thus into the unthreaded bores or recesses aligned therewith, the annular end cap is pushed away from the end of the housing. The annular end cap is also connected to the camming element 15a by a plurality of circumferentially spaced bolts 34 which extend through threaded openings in the annular end cap and into the camming element 15a. These bolts are not removed but are kept in place when the bolts 31 are removed. In this manner, as the bolts mounted in the threaded openings 33 push the annular end cap away from the housing end, the bolts 34 affixed to the camming member 15a move the camming member 15a outwardly thus releasing the collet 14 from gripping connection with the piece of the flowline F-2. In this manner, the collet is released and thus the flowline piece can be removed and the assembly can be reset for actual use.

Referring to FIG. 6, the apparatus A-2 is provided for connecting together flowline portions F-1 and F-2. The apparatus A-2 is similar in operation and use to the apparatus A-1 with certain differences. Thus, where accurate, the same numbers and letters will be used to describe the apparatus A-2, with the differences being noted.

The housing 40 for the apparatus A-2 is generally similar to the housing 10 for the apparatus A-1. The first end portion 40a of the housing 40 terminates in a beveled edge 40b for welding to the flowline F-1. The housing 40 incldues an interior, main bore B-1 which is formed by a series of interior wall sections. The generally cylindrical interior wall 41 for the bore B-1 includes a first outer wall portion 41a which terminates in first and second small radial steps 41b and 41c. A third and more substantial radial step or shoulder 41d forms a second cylindrical bore wall section 41e of a smaller interior diameter than the wall section 41a. The interior wall section 41e terminates in a radial step or shoulder 41f forming wall section 41g which terminates in radial portion 41h, which receives the end of the flowline F-2.

A gripping means generally designated as 44 is mounted concentrically inside of a camming means generally designated as 45. A gripper actuator means generally designated as 46 is positioned adjacent to the gripping means 44 and is provided for movement between initial and actuated positions to move the gripping means 44 into gripping engagement against the flowline F-2. A sealing means generally designated as 18 (identical number with respect to apparatus A-1) is mounted against the housing surface 41e for the purpose of being moved into axial compression and sealing engagement against the flowline F-2 and the interior wall portion 41e. A seal actuator means generally designated as 49 is mounted within the housing for the purpose of moving the sealing means 18 into the radially expanded position.

The position lock means generally designated as 50 for the apparatus A-2 is mounted within the housing between the interior bore wall section 41a and the grip actuator means 46 and seal actuator means 49 and includes first and second lock means 51 and 52 provided to lock the positions of grip actuator means 46 and seal actuator means 49, respectively.

The camming means 45 includes a camming element 45a mounted within the interior bore 41. The generally cylindrical camming element 45a includes a plurality of interiorly facing wedging surfaces adapted to engage complementary wedging surfaces on the collet 44a of the gripping means 44. The collet 44a is mounted concentrically within and against the camming member 45a and is moved into radial engagement against the flowline F-2 in response to movement of the collet member axially toward the second open end 40c of the housing 40.

The grip actuator means 46 includes a grip actuator piston 46a which is generally L-shaped as viewed in the sectional view of FIG. 6. The grip actuator piston 46a includes a flange portion 46b having an O-ring seal mounted therein in slideable, sealing engagement against the housing interior wall section 41a. In this manner, the grip actuator member or piston 46a is mounted for slideable, sealable movement and is in continuous engagement with the interior end 44b of the collet 44a. The flange portion 46b of the grip actuator member 46a is of sufficient diameter to ride against the slight shoulder 41b in the wall section 41a to thereby prevent axially movement to the right of the drawing of the grip actuator member 46a. The grip actuator member 46a includes an outer ratchet-type surface portion at 46c. The interior cylindrical surface of the grip actuator member 46c is of substantially the same initial diameter as the collet member 44a and is thus of slightly greater diameter than the outer surface of the flowline F-2.

The seal actuator piston 49a of the seal actuator means 49 is also a generally cylindrical member and has an interior cylindrical surface of substantially the same interior cylindrical diameter as the grip actuator member 46a. The seal actuator member or piston 49a includes an intermediate outer flange portion 49b which has O-ring positioned therein to slideably, sealably engage against the interior housing wall section 41a. The seal actuator member 49a further includes a sealing end portion which continuously engages the sealing means 18.

The position lock means 50 is mounted concentrically outwardly of both the grip actuator piston 46a and the seal actuator piston 49a and includes the first and second position lock means 51 and 52 for holding the members 46a and 49a in actuated positions. The position lock means 50 includes a cylindrical element 50a having interior and outside cylindrical surfaces. The outer cylindrical surface of the position lock member 50a includes a ridge which rides against the corresponding housing ridge 41c on the interior wall section 41a to prevent the position lock member 50 from moving to the right of the drawing toward the seal means 18. A seal 53 is positioned on the interior cylindrical surface of the position lock member 50a to provide slideable, sealable movement between the position lock member 50a and the grip actuator member 46a. Another seal 54 is positioned in the interior surface of the position lock member 50a and extends into slideable, sealable engagement against the outer cylindrical surface of the seal actuator member 49a to provide slideable, sealable movement therebetween.

The first position lock means 51 is mounted in a circumferential recess in the position lock member 50a and includes a plurality of ratchet-segments 17a which are resiliently urged into engagement against ratchet teeth in the outer surface of the grip actuator member 46a. The ratchet members 17a of the first position lock means 51 are continuous engagement with the ratchet teeth on the outer surface of the grip actuator member thereby locking the relative movement of the grip actuator member as it is moved axially toward the second, open end 40c of the housing 40.

The second position lock means 52 also includes a plurality of circumferentially spaced ratchet-type segments 17a resiliently mounted in a circumferential recess in the position lock member 50a. The second position lock means 52 is the seal position lock means and again includes a plurality of circumferentially spaced ratchet-type members 17a resiliently urged into ratchet-type engagement against the outer ratchet surface of the seal actuator piston member 49a. In this manner, the seal position lock means 52 serves to continuously engage and hold in axially actuated position the seal actuator member 49a as it is moved axially toward the sealing means 18.

In operation, hydraulic fluid under pressure introduced into the first fluid entry valve 56 in order to move the grip actuator member 46a axially toward the collet 44a thereby moving the collet 45a into a radially inward gripped position against the flowline F-2. During such hydraulic actuation of the grip actuator member 46a, the seal position lock member 50a is held in position by engagement against the housing wall section ridge 41c. And, the grip position lock means 51a mounted in the grip position lock member 50a acts to continuously engage and hold the actuated position of the grip actuator member 46a by the ratchet-type interlocking of the ratchet surfaces. Hydraulic fluid under pressure is then applied through valve 57 between the position lock member 50a and the seal actuator piston 49a to move the seal actuator piston axially to the right in the drawing toward the sealing means 18. As the seal actuator member 49a is moved to its actuated position, the second or seal position lock means 52 serves to continuously engage and hold in a ratchet-type locking engagement the relative position of the seal actuator member with respect to the position lock member 50a. In this manner, the position lock means 51 and 52 mounted with the seal position lock member 50a lock in actuated positions both the grip actuator member 46a and the seal actuator member 49a thereby gripping and sealing the flowline F-2.

The foregoing disclosure and description of the invention are illustrative and explanatory thereof, and various changes in the size, shape and materials, as well as in the details of the illustrated construction may be made without departing from the spirit of the invention.

I claim:

1. Apparatus for connecting together flowlines, comprising:

a generally cylindrical housing having a first end for connection to a first flowline and having a bore therethrough, said generally cylindrical housing having a second, open end to receive a second flowline in said bore;

a generally cylindrical gripping means mounted within said bore for receiving said second flowline member, said gripping means being movable radially inwardly into gripping engagement with said second flowline;

camming means mounted within said housing bore in engagement with said gripping means for moving said gripping means into gripping engagement with said second flowline in response to relative movement between said camming means and said gripping means;

gripper actuator means mounted within said housing bore for axial movement from an initial to an actuated position in engagement with said gripper means to effect relative movement between said gripping means and said camming means to move said gripping means into gripping engagement with said second flowline;

grip position lock means mounted in said housing bore in engagement with said gripper actuator means for locking said gripper actuator means in said actuated position;

a generally cylindrical sealing means mounted within said housing bore for radial expansion in response to axial compression to seal between said second flowline and said housing bore;

seal actuator means which is generally cylindrical and mounted wihtin said housing bore for axial movement from an initial to an actuated position in sufficient engagement with said seal means to axially compress said sealing means to effect a seal between said second flowline and said housing bore;

seal position lock means mounted in said seal actuator means in engagement with said gripper actuator means for locking said seal actuator means in said actuated position; and fluid actuator means for using pressurized fluid to move said grip actuator means and said seal actuator means to said actuated position.

2. The structure set forth in claim 1, wherein said grip position lock means includes:
means for continuously engaging said gripper actuator means for preventing return thereof to said initial position.

3. The structure set forth in claim 1, wherein said grip position lock means includes:
a ratchet element mounted within said housing bore; and
resilient means for urging said ratchet element into engagement with said grip actuator means to prevent return thereof from said actuated position to said initial position.

4. The structure set forth in claim 1, including:
said gripper actuator means being a generally cylindrical grip actuator piston mounted within said housing bore for movement between initial and actuated positions and including a grip actuating end positioned in engagement with said gripping means; and
said grip position lock means including means for continuously engaging said generally cylindrical grip actuator piston for preventing return of said piston member from said actuated position.

5. The structure set forth in claim 4, wherein:
said seal actuator means includes a generally cylindrical seal actuator piston mounted for axial movement between an initial and an actuated position in said housing bore, said seal actuator piston being positioned between said grip actuator piston and said housing bore, said seal actuator piston including a seal actuating end engaging said generally cylindrical sealing means; and
said seal position lock means being mounted with said seal actuator piston for engaging said grip actuator piston to prevent relative movement therebetween and to prevent return of said seal actuator piston from said actuated position.

6. The structure set forth in claim 5, wherein said seal position lock means includes:
said seal actuator piston having a circumferential recess therein opening toward said grip actuator piston;
a plurality of ratchet members are mounted in said seal actuator piston recess and resilient members are mounted in said recess to urge said ratchet members into engagement with said grip actuator piston to hold said seal piston member in said actuated position.

7. The structure set forth in claim 6, including:
said grip actuator piston being mounted within said housing bore for slideable movement with respect to said housing bore;
grip actuator seal means mounted on said grip actuator piston for sealably engaging said housing bore;
said seal actuator piston being mounted within said housing bore for slideable movement with respect to said housing bore;
seal actuator seal means mounted on said seal actuator piston for sealably engaging said housing bore; and
said housing having a fluid injection port for the introduction of hydraulic fluid under pressure between said grip actuator piston and said seal actuator piston to move said grip actuator piston to sid actuated position.

8. The structure set forth in claim 7, wherein:
said seal actuator piston and said housing bore cooperate to form an annular cavity; and
said annular cavity being filled with hydraulic fluid to hold said seal actuator piston in said initial position during movement of said grip actuator piston to said actuated position.

9. The structure set forth in claim 8, including:
means for releasing said hydraulic fluid from said annular cavity to allow movement of said seal actuator piston to said actuated position.

10. The structure set forth in claim 1, wherein:
said grip position lock means includes ratchet means mounted within said housing for engaging said grip actuator piston for preventing return of said piston from said actuated position.

11. The structure set forth in claim 10 wherein said grip position lock means further includes:
said housing having a circumferential recess opening to said housing bore;
a plurality of ratchet elements are mounted within said recess, each ratchet element including a grooved surface for engaging said grip actuator piston, and
a resilient member positioned in said housing recess to resiliently urge each ratchet element into engagement with said grip actuator piston.

12. The structure set forth in claim 1, including:
said camming means including a generally cylindrical camming member having a plurality of inclined camming surfaces, said generally cylinderical camming member being mounted within said housing bore substantially adjacent to said housing second open end;
said generally cylindrical gripping means including a generally cylindrical collet member being positioned concentrically within said generally cylindrical camming member;
said generally cylindrical collet member having a plurality of outer, camming surfaces complementary to said camming surfaces on said camming member whereby, upon axial movement of said collet member toward said second outer end of said housing, said collet member is moved radially inwardly into gripping engagement with said second flowline.

13. The structure set forth in claim 12, including:

an annular end cap mounted with said housing over said second open end, said annular end cap having an opening therethrough to allow said second flowline to be inserted into said housing bore;

a plurality of mounting bolts threadedly mounted in said annular cap and threadedly extended into threaded openings in said housing to affix said annular cap to said housing;

a plurality of threaded bolts threadedly extending through threaded openings in said annular cap and into threaded openings in said camming member to threadedly affix said annular cap to said camming member.

14. The structure set forth in claim 13, including:

said annular cap further having a plurality of threaded openings which are alignable with unthreaded recesses in said housing end whereby, upon the insertion of threaded bolts into said annular cap and into said unthreaded recesses, said annular cap is moveable away from the end of said housing.

15. The structure set forth in claim 1, wherein said seal position lock means includes:

means for continuously engaging said seal actuator means for preventing return thereof to said initial position.

16. The structure set forth in claim 1, wherein said seal position lock means includes:

a ratchet element mounted in said seal actuator means; and resilient means for urging said ratchet element into engagement with said gripper actuator means to prevent return of said seal actuator means to said initial position.

17. Apparatus for connecting together flowlines, comprising:

a genreally cylindrical housing having a first end for connection to a first flowline and having a bore therethrough, said generally cylindrical housing having a second, open end to receive a second flowline in said bore;

a generally cylindrical gripping means mounted within said bore for receiving said second flowline member, said gripping means being movable radially inwardly into gripping engagement with said second flowline;

camming means mounted within said housing bore in engagement with said gripping means for moving said gripping means into gripping engagement with said second flowline in response to relative movement between said camming means and said gripping means;

gripper actuator means mounted within said housing bore for axial movement from an initial to an actuated position in engagement with said gripper means to effect relative movement between said gripping means and said camming means to move said gripping means into gripping engagement with said second flowline;

grip position lock means mounted within said housing bore in engagement with said gripper actuator means for locking said gripper actuator means in said actuated position;

a generally cylindrical sealing means mounted within said housing bore for radial expansion in response to axial compression to seal between said second flowline and said housing bore;

seal actuator means which is generally cylindrical and mounted within said housing bore for axial movement from an initial to an actuated position in sufficient engagement with said seal means to axially compress said sealing means to effect a seal between said second flowline and said housing bore;

seal position lock means mounted within said housing bore in engagement with said seal actuator means for locking said seal actuator means in said actuated position;

fluid actuator means for using pressurized fluid to move said grip actuator means and said seal actuator means to said actuated positions;

said gripper actuator means being a generally cylindrical grip actuator piston mounted within said housing bore for movement between initial and actuated positions and includng a grip actuating end positioned in engagement with said gripping means;

said grip position lock means including means for continuously engaging said generally cylindrical grip actuator piston for preventing return of said piston member from said actuated position;

said grip position lock means further includes a generally cylindrical lock member positioned between said grip actuator piston and said housing bore and having a circumferential recess therein with;

a plurality of ratchet members mounted in said circumferential recess; and resilient elements are mounted within said circumferential recess of said generally cylindrical lock member in engagement with said ratchet members to resiliently urge said ratchet members into engagement with said grip actuator piston.

18. The structure set forth in claim 17, including:

said plurality of ratchet members are positioned in said generally cylindrical lock member in a circumferential pattern to be resiliently urged into ratchet locking engagement with said generally cylindrical grip actuator piston.

19. The structure set forth in claim 18, wherein:

said seal actuator means includes a generally cylindrical seal actuator piston, said seal actuator piston being positioned concentrically within said generally cylindrical lock member and including a seal actuating end engaging said generally cylindrical sealing means;

said generally cylindrical lock member having a second circumferential recess therein; and said seal position lock means including a plurality of ratchet members; positioned in said second circumferential recess and resilient elements are mounted in said second circumferential recess between said ratchet members and said generally cylindrical lock member to resiliently urge said ratchet members into engagement with said seal actuator piston to lock said seal actuator piston in said actuated position.

20. The structure set forth in claim 19, including:

said fluid actuator means includes a first fluid injection port positioned between said grip actuator piston and said generally cylindrical lock member for the introduction of hydraulic fluid under pressure therebetween to move said grip actuator piston to said actuated position; and said housing bore and said generally cylindrical lock member having an opposing shoulders to hold said generally cylindrical lock member against movement toward said seal actuator member.
21. The structure set forth in claim 20, including:
said fluid actuator means including a second fluid injection port positioned between said generally cylindrical lock member and said seal actuator piston for the introduction of hydraulic fluid under pressure therebetween to move said seal actuator piston to said actuated position.

* * * * *

UNITED STATES PATENT AND TRADEMARK OFFICE
CERTIFICATE OF CORRECTION

PATENT NO. : 4,728,125
DATED : MARCH 1, 1988
INVENTOR(S) : BOBBY J. RENEAU

It is certified that error appears in the above—identified patent and that said Letters Patent is hereby corrected as shown below:

Column 5, line 3: change "an-outer" to -- an outer --.

Column 7, line 3: change "seoond" to -- second --.

Column 7, line 5: change "oamming" to -- camming --.

Column 8, line 25: change "incldues" to -- includes --.

Column 11, line 10: change "wihtin" to -- within --.

Column 12, line 19, change "sid" to -- said --.

Signed and Sealed this

Twenty-first Day of March, 1989

Attest:

DONALD J. QUIGG

Attesting Officer

Commissioner of Patents and Trademarks